US 6,745,243 B2

(12) United States Patent
Squire et al.

(10) Patent No.: US 6,745,243 B2
(45) Date of Patent: Jun. 1, 2004

(54) METHOD AND APPARATUS FOR NETWORK CACHING AND LOAD BALANCING

(75) Inventors: Matthew B. Squire, Raleigh, NC (US); James V. Luciani, Groton, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/107,069

(22) Filed: Jun. 30, 1998

(65) Prior Publication Data

US 2002/0049840 A1 Apr. 25, 2002

(51) Int. Cl.[7] .............................................. G06F 15/16
(52) U.S. Cl. ...................................... 709/227; 709/245
(58) Field of Search ................................. 709/230, 203, 709/217, 219, 224, 227, 250, 202, 245

(56) References Cited

U.S. PATENT DOCUMENTS

| 5,425,028 | A | * | 6/1995 | Britton et al. | 370/94.1 |
|---|---|---|---|---|---|
| 5,485,455 | A | * | 1/1996 | Dobbins et al. | 370/60 |
| 5,509,121 | A | * | 4/1996 | Nakata et al. | 395/200.1 |
| 5,511,208 | A | * | 4/1996 | Boyles et al. | 395/800 |
| 5,566,170 | A | * | 10/1996 | Bakke et al. | 370/60 |
| 5,720,032 | A | * | 2/1998 | Picazo, Jr. et al. | 395/200.2 |
| 5,737,333 | A | * | 4/1998 | Civanlar et al. | 370/352 |
| 5,774,660 | A | * | 6/1998 | Brendel et al. | 709/201 |
| 5,787,470 | A | * | 7/1998 | DeSimone et al. | 711/124 |
| 5,793,763 | A | * | 8/1998 | Mayes et al. | 370/389 |
| 5,872,783 | A | * | 2/1999 | Chin | 370/392 |
| 5,878,213 | A | * | 3/1999 | Bittinger et al. | 709/203 |
| 5,905,726 | A | * | 5/1999 | Gupta | 370/390 |
| 5,910,954 | A | * | 6/1999 | Bronstein et al. | 370/401 |
| 5,911,084 | A | * | 6/1999 | Jones et al. | 395/882 |
| 5,918,019 | A | * | 6/1999 | Valencia | 709/227 |
| 5,951,694 | A | * | 9/1999 | Choquier et al. | 714/15 |
| 5,953,338 | A | * | 9/1999 | Ma et al. | 370/395 |
| 5,964,891 | A | * | 10/1999 | Caswell et al. | 714/31 |
| 5,978,381 | A | * | 11/1999 | Perlman et al. | 370/432 |
| 5,983,265 | A | * | 11/1999 | Martino, II | 709/206 |
| 5,987,516 | A | * | 11/1999 | Rao et al. | 709/227 |
| 5,991,297 | A | * | 11/1999 | Palnati et al. | 370/389 |
| 5,991,306 | A | * | 11/1999 | Burns et al. | 370/429 |
| 5,991,806 | A | * | 11/1999 | McHann, Jr. | 709/224 |
| 5,991,817 | A | * | 11/1999 | Rowett et al. | 709/250 |
| 5,991,854 | A | * | 11/1999 | Watkins | 711/135 |
| 6,006,264 | A | * | 12/1999 | Colby et al. | 709/226 |
| 6,006,272 | A | * | 12/1999 | Aravamudan et al. | 709/245 |
| 6,018,619 | A | * | 1/2000 | Allard et al. | 709/224 |
| 6,021,462 | A | * | 2/2000 | Minow et al. | 711/114 |
| 6,023,724 | A | * | 2/2000 | Bhatia et al. | 709/218 |
| 6,023,727 | A | * | 2/2000 | Barrett et al. | 709/221 |

(List continued on next page.)

FOREIGN PATENT DOCUMENTS

WO    WO 98/09410    *    3/1998    ........... H04L/12/56

OTHER PUBLICATIONS

Conover, "Arrowpoint CSS–100 Switch: Layer–by–layer Load–Balancing", Network Computing, 1998, N 921, pp. 2.*

(List continued on next page.)

Primary Examiner—Bunjob Jaroenchonwanit
(74) Attorney, Agent, or Firm—Blakely Sokoloff Taylor & Zafman LLP

(57) ABSTRACT

An apparatus comprising a network interface coupled to a data network, a network address translator and a controller. The network interface may receive network traffic from the communicatively coupled data network adhering to any of a number of alternative network protocols. The network address translator identifies network session information within the received network traffic adhering to any of a number of alternative protocols. The controller selects network traffic to be cached based, at least in part, on the network session information identified by the network address translator.

23 Claims, 5 Drawing Sheets

U.S. PATENT DOCUMENTS

| | | | | | |
|---|---|---|---|---|---|
| 6,029,203 | A | * | 2/2000 | Bhatia et al. | 709/244 |
| 6,041,357 | A | * | 3/2000 | Kunzelman et al. | 709/228 |
| 6,061,714 | A | * | 5/2000 | Housel, III et al. | 709/203 |
| 6,070,187 | A | * | 5/2000 | Subramaniam et al. | 709/220 |
| 6,076,108 | A | * | 6/2000 | Courts et al. | 709/227 |
| 6,085,220 | A | * | 7/2000 | Courts et al. | 709/201 |
| 6,098,093 | A | * | 8/2000 | Bayeh et al. | 709/203 |
| 6,098,172 | A | * | 8/2000 | Coss et al. | 713/201 |
| 6,101,549 | A | * | 8/2000 | Baugher et al. | 709/238 |
| 6,119,167 | A | * | 9/2000 | Boyle et al. | 709/234 |
| 6,173,364 | B1 | * | 1/2001 | Zenchelsky et al. | 711/118 |
| 6,175,864 | B1 | * | 1/2001 | Addison et al. | 709/219 |
| 6,182,146 | B1 | * | 1/2001 | Graham-Cumming, Jr. | 709/238 |
| 6,233,245 | B1 | * | 5/2001 | Chapman et al. | 370/412 |
| 6,240,461 | B1 | * | 5/2001 | Cieslak et al. | 709/235 |
| 6,253,234 | B1 | * | 6/2001 | Hunt et al. | 709/213 |
| 6,263,368 | B1 | * | 7/2001 | Martin | 709/224 |
| 6,295,557 | B1 | * | 9/2001 | Foss et al. | 709/224 |
| 6,311,216 | B1 | * | 10/2001 | Smith et al. | 709/226 |
| 6,353,614 | B1 | * | 3/2002 | Borella et al. | 370/389 |
| 6,370,584 | B1 | * | 4/2002 | Bestavros et al. | 709/238 |
| 6,381,676 | B2 | * | 4/2002 | Aglietti et al. | 711/133 |

OTHER PUBLICATIONS

Sheldon et al., "Content Routing for Distributed Information Servers", Forth International Conference on Extending Database Technology, Cambridge, England, Mar. 1994, pp. 15.*

Shelden et al., "Content Routing for Distributed information Servers", Mar. 1994, www.psrg.lcs.mit.edu, 15 pages.*

Bransky et al., "Layer 4 switching", Sep. 1997, www.burtongroup.com/pulic/whitepapaers, 4 pages.*

* cited by examiner

--PRIOR ART--

--PRIOR ART--

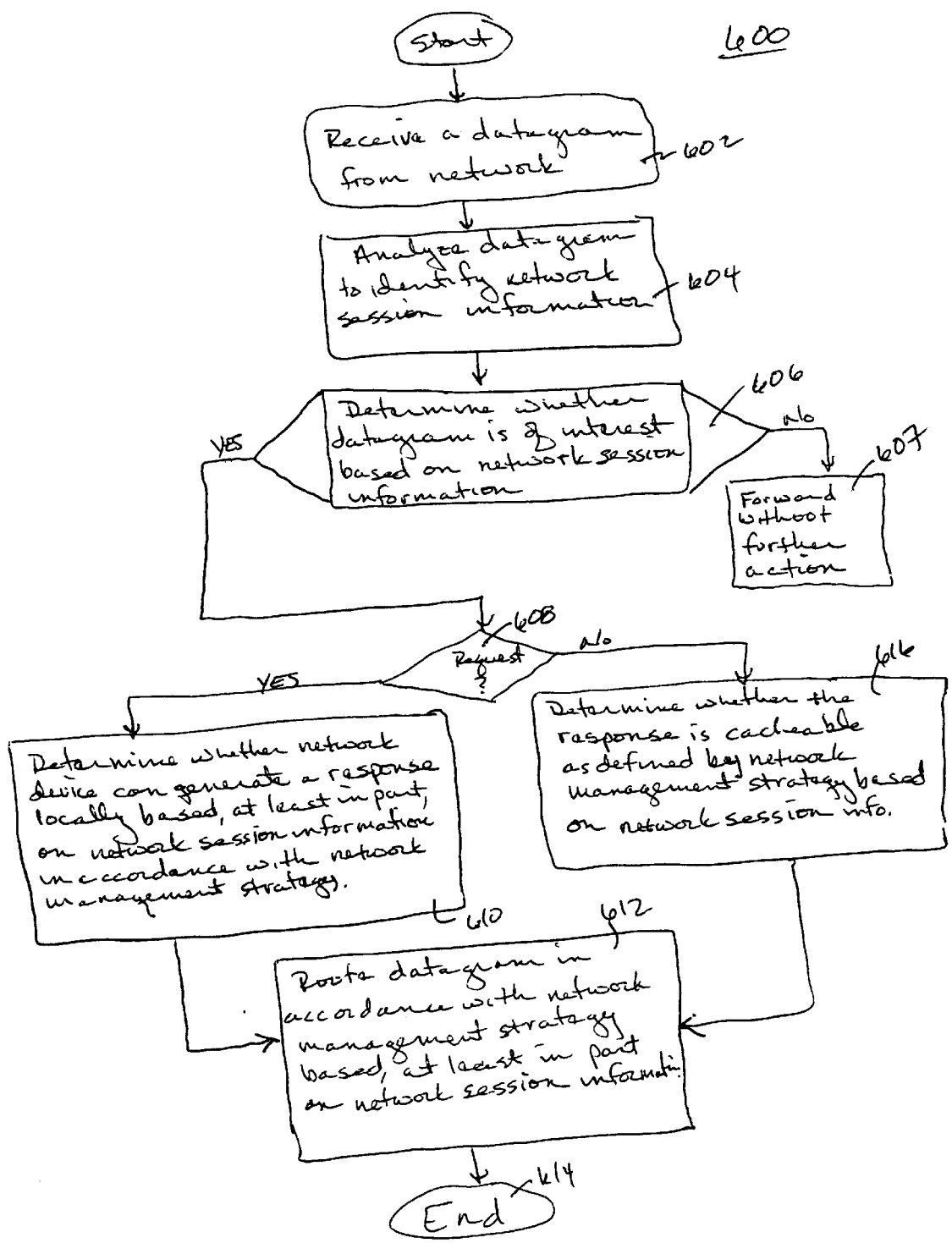

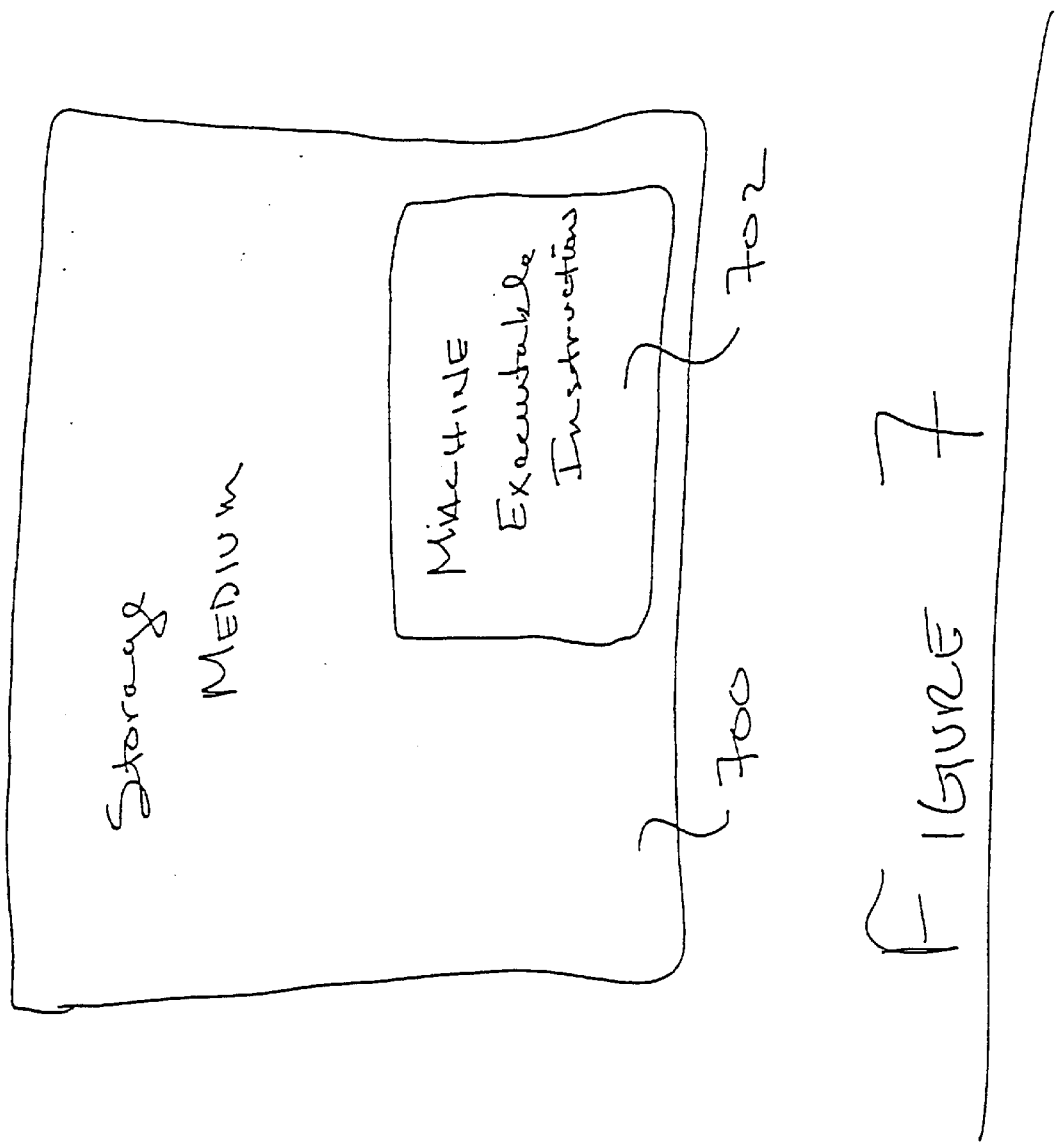

METHOD AND APPARATUS FOR NETWORK CACHING AND LOAD BALANCING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise expressly reserves all rights whatsoever in said copyright works.

BACKGROUND OF THE INVENTION

1. Field of the Invention

The present invention relates to the field of data network management and, in particular, to a method and apparatus for network caching and load balancing employing network address translation.

2. Background Information

As computer technology has evolved, so too has the use of networks which communicatively couple computer systems together allowing remote computer systems to communicate with one another. One of the more popular of such computer networks is colloquially referred to as the Internet, which is an internetworking of a number of publicly accessible networks (e.g., Local Area Networks (LANs)) and servers throughout the world via network switches, bridges, routers and the like, generically referred to as network devices. However, the explosive growth in computer sales has led to congestion of network traffic on the worlds networks. In response to inadequate bandwidth infrastructure, customers and vendors search for methods of reducing the bandwidth requirements of the most heavily used of the network protocols. Recently, network caches and other load balancing devices have been added to networks in an effort to more efficiently manage the finite bandwidth of the Internet.

In general, a network cache operates by intercepting certain network traffic, in accordance with a network management strategy. In a typical implementation on the Internet, a network cache intercepts internet protocol (IP) requests for information in a higher layer protocol. For example, a network cache may be employed to cache all world-wide web requests made through it to the Internet. Accordingly, the network cache will monitor the transmission control protocol (TCP) port 80, commonly assigned for the HyperText Transfer Protocol (HTTP) messages associated with WWW usage, and determines whether it can satisfy the request locally. If the request can be fulfilled locally, then the request need not be forwarded, thus reducing the bandwidth requirements of the protocol, and the client receives a quicker response, thus improving the perceived performance of the network. If the request cannot be fulfilled locally, the cache re-issues the request, destined to the proper origin server which responds to the request. The response returned by the origin server may then be cached by the network cache to satisfy later requests for the same information.

One problem commonly associated with network caches is the extra processing required for each packet in the data flow, i.e., the cache must decide which packets to forward normally and which to process for caching. Generally, network caches typically make this determination based on layer 3 or, layer 4 level information (of the International Standards Organization's (ISO) Open System Interconnection (OSI) reference model).

That is, network caches have historically relied on layer 3 and/or layer 4 information embedded within the network traffic to identify that traffic which is cacheable. Those skilled in the art will appreciate that layer 3 is the network layer, and provides path control within the transmission medium of the data network. Typically, network devices route packets of information over a data network based on network layer address information. The OSI network layer is the domain wherein connection-oriented and connectionless-oriented networks operate, network addresses are assigned, network topology is known and routing decision processes are typically performed. One example of a layer 3 protocol is the Internet Protocol (IP) suite used within the Internet.

Typically, however, prior art network caches discriminate network traffic based on layer 4 information. Layer 4 of the OSI reference model is defined as the transport layer. Layer 4 defines the transport layer of the OSI reference mode and controls the movement of data between systems, defines protocols for structuring messages and supervises the validity of transmissions by performing error checking. Again, with reference to the Internet, the transport layer (e.g., layer 4) would include the Transmission Control Protocol (TCP), for example. An example of a network cache employing OSI layer 4 functionality is the Cisco Cache Engine™ commonly available from Cisco Systems.

Thus, while it is easy to discriminate network traffic at layer 3 and/or layer 4 (e.g., all IP traffic, or all traffic passing through TCP port 80), it can quickly overwhelm the processing capability of prior art network caches, necessitating the deployment of several caches throughout the network to handle the network traffic. Accordingly, the introduction of prior art network caches, although heralded as network-saving devices, have themselves become network traffic congestion points.

Load balancing devices of the prior art also suffer from the aforementioned limitations. A load balancing device is designed to route network traffic through optimal data paths based on a number of traffic-centric and network-centric parameters, in accordance with a network management strategy. Accordingly, load balancing devices typically support a large number of network connections and must perform rudimentary address translation. Thus, a load balancing device is typically implemented as a front end for a collection of servers. Clients connect to the load balancing device instead of directly to the servers. Based on certain metrics (server load, distance, etc.) the load balancing device assigns the client to a server. The load balancing device then translates and forwards all traffic between the client and the assigned server.

None of the prior art network caches or load balancing devices, however, are optimized to discriminate network traffic based on network session information, e.g., at OSI layer 5, as means for selecting traffic to cache or determining network routing. As a result, prior art network caches/load balancers are tasked with attempting to cache all network traffic adhering network management strategy based on layer 3 and/or layer 4 information.

Accordingly, an improved method and apparatus for network caching and load balancing is presented, unencumbered by the deficiencies and inherent limitations commonly associated with the network devices of the prior art. It will be apparent to those skilled in the art, from the description to follow, that the present invention achieves these and other desired results.

SUMMARY OF THE INVENTION

In accordance with the teachings of the present invention, a method and apparatus for network caching and load balancing is provided. In particular, in accordance with one embodiment of the present invention, an apparatus comprising a network interface coupled to a data network, a network address translator and a controller is presented. The network interface receives network traffic from a communicatively coupled data network adhering to any of a number of alternative network protocols. The network address translator identifies network session information within the received network traffic adhering to any of a number of alternative protocols. The controller selects network traffic to be cached based, at least in part, on the network session information identified by the network address translator.

BRIEF DESCRIPTION OF DRAWINGS

The present invention will be described by way of exemplary embodiments, but not limitations, illustrated in the accompanying drawing in which like references denote similar elements, and in which:

FIG. 6 illustrates a flow chart of an example method for network caching and load balancing using network session information, in accordance with one embodiment of the present invention; and FIG. 7 illustrates a block diagram of a storage medium having stored therein machine executable instructions for network caching/load balancing incorporating the teachings of the present invention, in accordance with one embodiment of the present invention.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers and configurations are set forth in order to provide a thorough understanding of the present invention. However, it will also be apparent to those skilled in the art that the present invention may be practiced without these specific details. In other instances, well known features are omitted or simplified for clarity.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexers, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Figure 1:
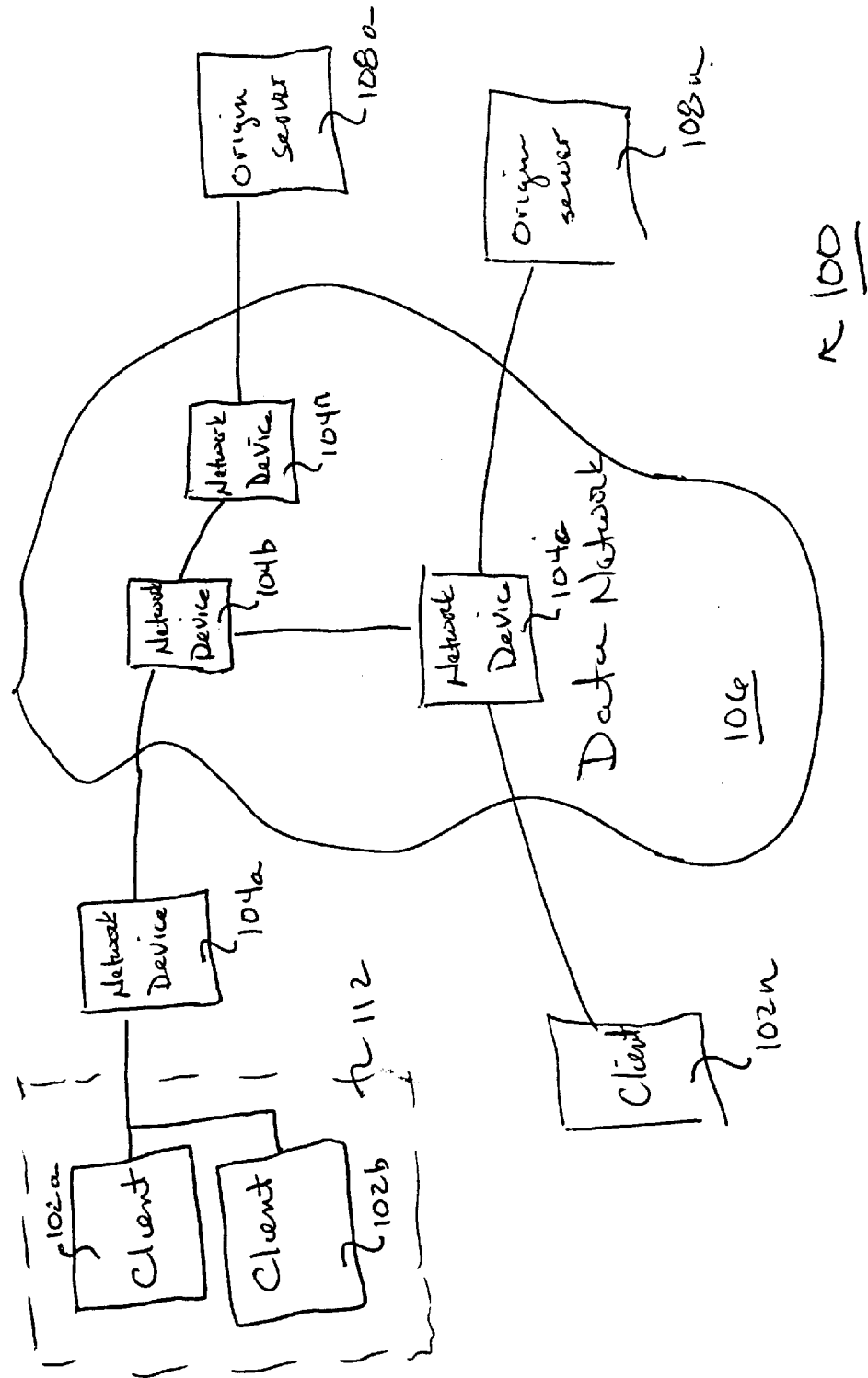
FIG. 1 illustrates a block diagram of an example data network incorporating a network caching/load balancing system in accordance with the invention.

With reference to FIG. 1, an operating environment within which the teachings of the present invention may be practiced will be developed more fully in accordance with the block diagram of example network 100. As depicted in accordance with the illustrated example embodiment of FIG. 1, data network 100 includes multiple clients 102a–102n, multiple origin servers (or hosts) 108, data network 106 and multiple network interface devices 104a–104n (often referred to as an intermediary network device) incorporating the teachings of the present invention. More particularly, as will be described in greater detail below, those network devices of network devices 104a–104n incorporating the teachings of the present invention incorporate network address translation (NAT) to discriminate network traffic adhering to any of a number of alternative OSI layer 5 network protocols for purposes of selecting network traffic for network caching and load balancing determination, in accordance with a network management strategy. That is, in accordance with the teachings of the present invention, innovative network devices 104a–104n incorporating the teachings of the present invention provide an innovative approach to network caching/load balancing through the integration of Network Address Translation (NAT). Thus, by integrating NAT, optimized for OSI layer 4 and OSI layer 5 network traffic discrimination and packet parsing, with a network cache and/or load balancer, which are heavily dependent on address translation and network traffic discrimination, alleviate the problems associated with prior art network caches/load balancers.

Those skilled in the art will appreciate that Network Address Translators (NAT) have heretofore been utilized to interconnect small private networks consisting of unregistered IP addresses with a global IP network using a limited number of registered IP addresses. Thus, the NAT devices of the prior art are typically used as a front-end for local networks, dynamically associating one of a limited number of globally registered IP addresses of the Internet with unregistered IP addresses of the local network. Consequently, NAT devices enable a network manager to avoid address renumbering in a private network when the topology outside the private network changes. In accordance with one aspect of the present invention, a NAT optimized to at least partially understand any of a number of network session protocols, e.g., OSI layer 5 information, is integrated with a network cache and/or a load balancer to provide an innovative solution to network caching and/or load balancing that is unencumbered by the limitations and deficiencies associated with the prior art.

With continued reference to FIG. 1, data network 100 is much like a typical prior art network described above, with the exception of the subset of network devices 104a–104n endowed with the integrated network cache/NAT and/or load balancer/NAT of the present invention. As used herein, clients 102 can be any of a wide range of computing devices known in the art which enable a user to access Internet 106.

In one embodiment, for example, clients 102 are client computers interconnected via a local backbone (e.g., Ethernet, Token Ring, etc.) 112 to a subnetwork 110, such as a local area network (LAN), wide area network (WAN), wide area information source (WAIS), and the like. In an alternate embodiment, client 102 is an electronic appliance, e.g., a webTV™ Internet Terminal available from Sony Electronics, Inc. of Park Ridge, N.J., that enables one to utilize the resources of Internet 106 without the need of a full-featured computer system.

Each origin server 108 (or host) is typically a computer system which can be accessed by clients 102. According to one embodiment, each origin server 108 includes one or more HyperText Markup Language (HTML) compatible documents (e.g., web-pages), which can be accessed via the HyperText Transfer Protocol (HTTP) via the Internet and displayed by an HTML-compatible user agent (e.g., browser) operating on a requesting client, e.g., clients 102. Network traffic generically refers to the data transmitted between clients and servers in a data network. In accordance with the HTTP protocol, for example, to obtain a copy of an HTML document from origin server 108, client 102 issues a "request datagram" to origin server 108 for a copy of the desired information, e.g., a web-page, whereafter either origin server 108 or an intervening network device 104 having the desired information stored in a network cache, issues a "response datagram" to the requesting client, e.g., client 102, that includes the requested information. Thus, in accordance with this Internet-centric example, network traffic is generally comprised of request datagrams and response datagrams. It should be noted, however, that different network topologies may well define network traffic differently, in accordance with their respective protocols. For example, a connection oriented network protocol such as the Frame Relay protocol may well define network traffic in terms of variable length "frames". Thus, as used herein, network traffic is intended to represent any or all of circuit switched or packet switched data types employed in communication over circuit switched or packet switched data networks.

It should be appreciated that although clients 102 and origin servers 108 are illustrated as being different machines, a single hardware system may be both a client 102 or a origin server 108, at different times. That is, if a hardware system is initiating an access for information from another system, then the hardware system is referred to as a client. Alternatively, if a hardware system is being accessed by another system to obtain information, then the hardware system is referred to as a host.

As alluded to above, data network 106 is a combination of multiple conventional hardware components, including computer systems, routers, repeaters, gateways, switches and hubs which may be interconnected throughout the world with wireline and wireless (e.g., satellite, terrestrial, and the like) communication connections. These hardware components are organized hierarchically to provide multiple logical levels of networks, which route data from one computer system to another. One example of a suitable data network 106 is the Internet. In accordance with the example implementation, data is transferred between computer systems using the well-known Transmission Control Protocol/Internet Protocol (TCP/IP) protocol. Data is generally transferred between network elements in units commonly referred to as "packets" or "datagrams". Typically, each packet includes data, a source address and a target address. As will be described in greater detail below, additional control information, generally included in a header, may also be included in the packet. The number of bytes of data contained within a packet is dependent upon the communication resources of the client, the origin server and the network protocol employed. As alluded to above, the transfer of such "packets" or "datagrams" in a data network will be generically referred to as network traffic.

The communication links illustrated in FIG. 1 may be any of a wide range of conventional wireline and wireless communication media, and may be different for different clients 102, origin servers 108 and network devices 104. For example, a communication link may be a cable, a fiber optic cable, or may represent a nonphysical medium transmitting electromagnetic signals in the electromagnetic spectrum. Additionally, a wireless communication link may also include any number of conventional routing or repeating devices, such as satellites or electromagnetic signal repeaters or basestations.

Figure 2:
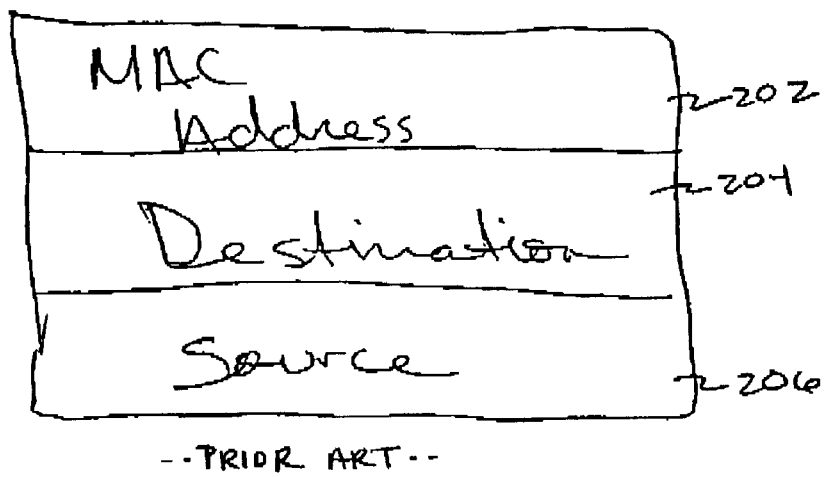
FIGS. 2 and 3 illustrate graphical representation of the information within datagrams used by prior art network caching and load balancing to make routing decisions.
Figure 3:
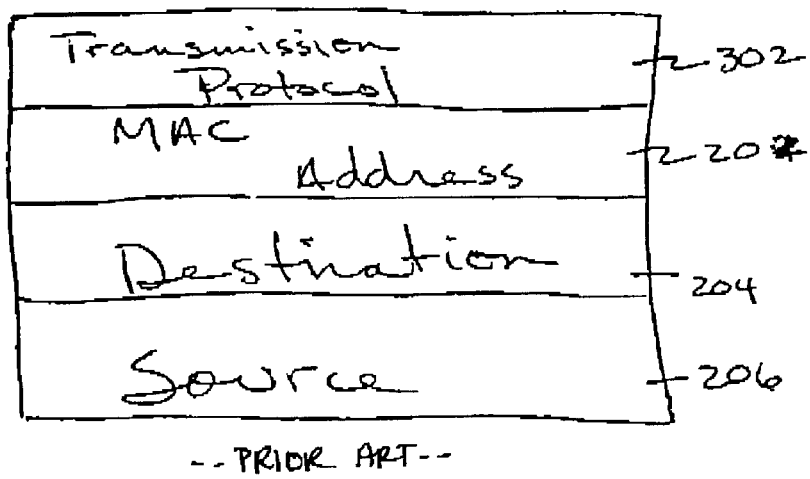
Figure 4:
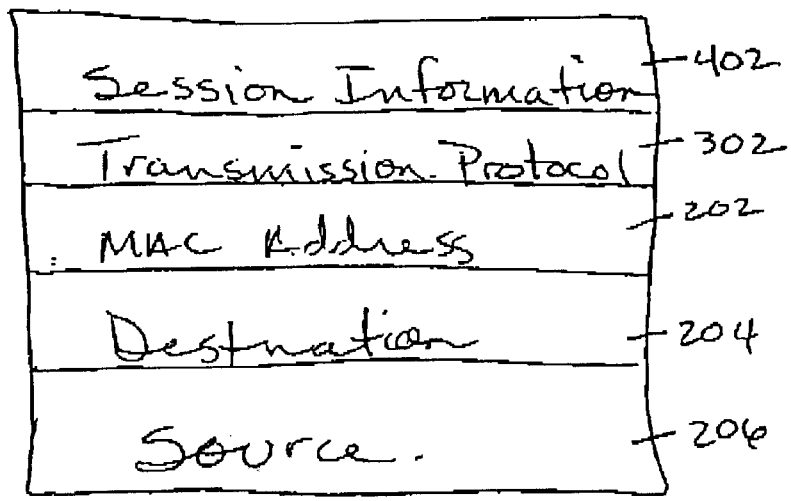
FIG. 4 illustrates a graphical representation of the information within a datagram used by a network cache/load balancing device incorporating the teachings of the present invention.

A graphical illustration of a network datagram is provided with reference to FIGS. 2–4. In FIGS. 2 and 3, for example, datagrams from which prior art network caching/load balancing devices determine routing are presented. As depicted in FIG. 2, datagram 200 is presented including only layer 3 addressing information 202, destination information 204 and source information 206. Accordingly, with reference to FIG. 1, a client 102*n* issuing such a request to origin server 108*n* via network device 104 would insert the MAC address for network device 104*n* in position 202. A prior art layer 3 network cache/load balancing device associated with network device 104*n* would consequently cache all response datagrams from a servers IP address passing through network device 104*n*.

With reference to FIG. 3, datagram 300 is presented including OSI layer 4 information. Accordingly, with reference to FIG. 1, a client 102*n* issuing such an HTTP request datagram to origin server 108*n* via network device 104*n* would specify TCP port 80, commonly associated with HTTP network traffic in position 302, while continuing to insert the MAC address for network device 104*n* in position 202, and so on. Accordingly, a network cache associated with network device 104*n* that is OSI layer 4 aware may well cache all response datagrams destined for TCP port 80 passing through network device 104*n*.

To improve the efficiency and the available bandwidth of network 100, a network device 104*a*–104*n* incorporating the teachings of the present invention employs a network cache and/or load balancing integrated with network address translation (NAT) to identify and discriminate network traffic based on network session layer information embedded within the network traffic. That is to say, a network device 104*a*–104*n* incorporating the teachings of the present invention integrates a network cache/load balancer with a NAT, which results in a more efficient network cache/load balancer that is OSI layer 5 aware. Accordingly, with reference to datagram 400 illustrated in FIG. 4, a network device 104*a*–104*n* incorporated with the integrated network management solution of the present invention identifies and discriminates network traffic for network caching and/or load balancing based on network session information 402 embedded within datagram 400 comprising the network traffic. Common examples of such network session layer protocols include HTTP resource identifiers, file transfer protocol (FTP) resource identifiers, Gopher service names, Archie services, and the like. Thus, as will be described in greater detail below, a network address device 104*a*–104*n* integrating NAT features with a network cache/load balancer analyzes network traffic to identify network session information and based, at least in part, on the network session information network caching/load balancing is performed in accordance with a predetermined network management strategy. Accordingly, a network device 104a–104n endowed with the integrated network cache/NAT or the load balancer/NAT is able to more efficiently discriminate network traffic amenable to the network caching/load balancing objectives of the network management strategy than network devices typical of the prior art relying on layer 3 and/or layer 4 information for such determinations.

Having introduced the operating environment within which the present invention may be practiced, a block diagram of an example network device incorporating the teachings of the present invention will now be described with reference to FIG. 5. Except for the teachings of the present invention, to be described more fully below, the term network device is broadly employed to describe any of a number of alternative network devices commonly known and used in the data networking arts to support communication between clients and a data network. Consequently, in one embodiment, network device 500 is a gateway server endowed with the integrated NAT/network cache and/or NAT/load balancer of the present invention, which operates as an intermediary for some other server. In an alternate embodiment, for example, network device 500 is a router endowed with the integrated NAT/network cache and/or NAT/load balancer of the present invention, or a network switching apparatus similarly endowed, or the like. Thus, except for the teachings of the present invention, network device 500 is intended to represent any of a number of suitable conventional network devices.

In accordance with the teachings of the present invention, network device 500 is shown comprising network address translator 501, controller 502, storage device 504, client interface 506 and network interface 508, each communicatively coupled as depicted. As used herein, controller 502 is intended to represent any of a number of microprocessors, microcontrollers, programmable logic devices (PLDs), application specific integrated circuits (ASICs) and the like. As alluded to above, network address translator 501 translates address information from one domain to another. Since some IP protocols include IP addresses within their communications, NAT 501 must at least partially understand each of these protocols. That is, NAT 501 is able to discern and translate between any of a number of network session protocols including HyperText Transfer Protocol (HTTP), file transfer protocol (FTP), Gopher service names, Archie services, and the like. Thus, in accordance with the teachings of the present invention, network device 500 is depicted beneficially integrating the feature rich services of NAT 501 with a host of network caching/load balancing features to provide a network cache/load balancing network device 500 that is OSI layer 5 aware.

In accordance with one embodiment of the present invention, controller 502 of network device 500 is operative to analyze the content received from network address translator 501 and to determine how to handle the received network traffic, in accordance with a network management strategy. In one embodiment, for example, network device 500 is an integrated NAT/network cache, wherein controller 502 discriminates network traffic for caching based on network session information identified by network address translator 501. In an alternate embodiment, network device 500 is an integrated NAT/load balancer, wherein controller 502 discriminates network traffic for load balancing purposes based on network session information identified by network address translator 501. In yet another embodiment of the present invention, network device 500 is an integrated NAT/network cache/load balancer, wherein controller 502 discriminates network traffic for network caching and load balancing purposes based on the network session information identified by network address translator 501.

Figure 5:
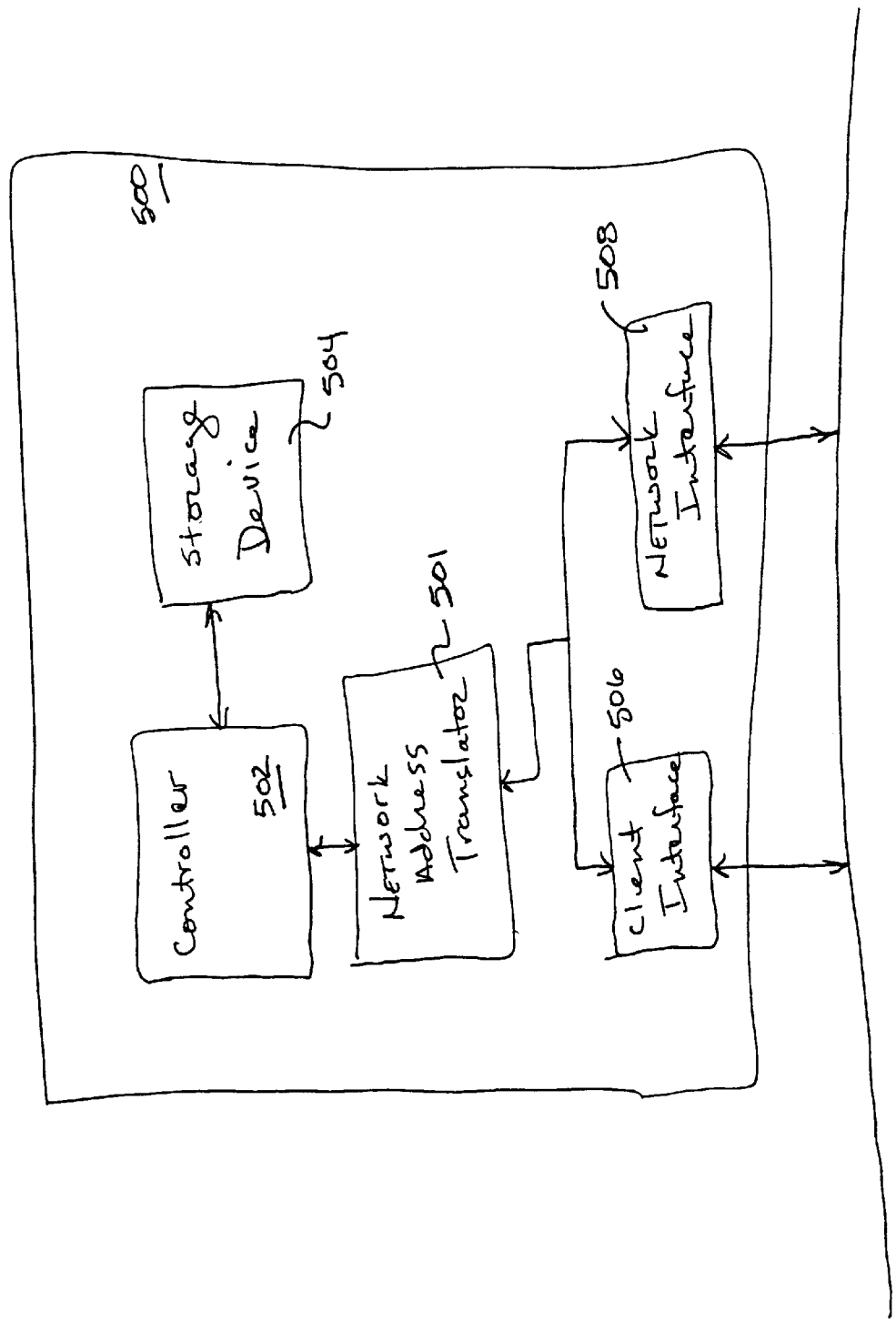
FIG. 5 illustrates a block diagram of a network device incorporating the teachings of the present invention, in accordance with one embodiment of the present invention.

With continued reference to FIG. 5, an example implementation will be developed in accordance with this last embodiment, e.g., network device 500 is an integrated NAT/network cache/load balancing network device in accordance with one embodiment of the present invention. In accordance with the example embodiment, controller 502 is operative to receive network session information from NAT 501, from which controller determines whether the received network traffic is cacheable or amenable to load balancing in accordance with a network management strategy. If, from the network session information provided by NAT 501, controller 502 determines that the received network traffic is, for example, an HTTP resource identifier datagram denoting a particular information file to which a response can be generated from information cached locally in storage device 504, a response datagram is generated by controller 502 and transmitted to the requesting client via client interface 506, in furtherance of the network management strategy. If, however, the HTTP request datagram cannot be fulfilled locally, or in accordance with the network management strategy the datagram does not possess the required network session information, controller 502 reissues the request datagram on the data network to the origin server identified in the datagram via network interface 508, in accordance with the load balancing parameters defined by the network management strategy. Thus, it will be apparent to those skilled in the art that network device 500 endowed with the teachings of the present invention is operative to more efficiently handle received datagrams as compared to the prior art network devices without the integrated NAT 501.

As used herein storage device 504 is intended to represent any of a number of alternative storage media. In one embodiment, for example, storage device 504 is a network cache comprised of a memory device, or an array of such devices, such as a random access memory (RAM), flash memory device, or the like. In one embodiment, network cache 504 is a magnetic storage media such as a hard disk, redundant array of inexpensive disks (RAID) system, re-writeable compact disk, tape media, or the like. In one embodiment, network cache 504 is a RAM disk, e.g., an array of RAM devices partitioned and functioning as a fast hard disk drive. In one embodiment, network cache 504 employs a first-in first-out (FIFO) caching strategy, wherein the oldest of the cached response messages are purged to make room for newly received response messages. In another embodiment, network cache 504 employs a pseudo-FIFO strategy based, in part, on the network session information associated with the cached information.

Those skilled in the art will appreciate, however, that network device 500 need not include a network cache in order to beneficially practice the present invention. That is, network device 500 may simply perform load balancing based, at least in part, on the network session information identified by network address translator 501. Thus, those skilled in the art will appreciate that any of a number of storage media and caching strategies may well be employed without deviating from the spirit and scope of the present invention.

Similarly, controller 502 is intended to represent any of a number of alternative execution devices known in the art. That is, controller 502 may be a processor, a microcontroller, an application specific integrated circuit (ASIC), a special purpose processor (SPP), and the like. Further, although depicted as separate entities, those skilled in the art will appreciate that controller 502 and NAT 501 may well be integrated within the same device, wherein controller provides a network address translation service upon execution of a plurality of programming instructions. Accordingly, deviations from and modifications to the foregoing description may be made without deviating from the spirit and scope of the present invention.

Given the foregoing architectural description, the operation of example network device 500 incorporating the teachings of the present invention will now be developed with reference to the flow chart depicted in FIG. 6. In particular, an example method for network caching and load balancing utilizing network session information will be developed with reference to the flow chart depicted in FIG. 6, in accordance with one embodiment of the present invention.

In accordance with the example embodiment depicted in FIG. 6, the processes begins at 602 wherein network device 500 receives network traffic via network interface 508. At 604, network address translator 501 analyzes the received datagram to identify network session information identified within the network traffic, if any. At 606, based, at least in part, on the network session information, e.g., OSI layer 5 information, received from NAT 501, controller 502 determines whether the received network traffic is eligible for network caching/load balancing, in accordance with a defined network strategy. If controller 502 determines that the received network traffic is not eligible, the network traffic is forwarded to the data network 106 without further action, 607.

If, however, based on the network session information identified by NAT 501, controller 502 determines that the received network traffic conforms is of interest as defined by the network management strategy, controller 502 determines whether the received datagram is a request datagram, at 608. If controller 502 does determine that the received datagram is a request datagram, controller 502 determines whether network device 500 can generate a response locally based, at least in part on the identified network session information, 610. That is, based on the network session information, controller 502 determines whether the requested information is available locally within storage device 504. If so, a response datagram is generated by controller 502 and the datagram is routed to the requesting client in accordance with the network management strategy, 612, and the process ends with 614.

If, alternatively, controller 502 determines the received datagram is a response datagram at 608, controller 502 further determines at 616 whether the response datagram is cacheable as defined by the network management strategy based, at least in part, on the identified network session information. If so, controller 502 stores a copy of the information contained in the response datagram in storage device 504, and subsequently routes the datagram in accordance with the network management strategy to the requesting client based, at least in part, on the identified network session information, at 612, before the process ends 614.

In another embodiment of the present invention, the teachings of the present invention for controlling access to network information sources are embodied in software. Accordingly, FIG. 7 illustrates an example storage medium 700 having stored thereon machine executable instructions 702 which, when processed by a controller transforms an appropriately configured machine executing machine executable instructions 702 into a network device incorporating the teachings of the present invention. That is, a network device with integrated NAT/network cache and/or NAT/load balancing characteristics. In accordance with the illustrated example embodiment of FIG. 7, storage medium 700 is intended to represent any of a number of alternative storage media including, but not limited to, floppy disks, magnetic tape, compact disk, digital versatile disk, optical disks, and the like. Further, those skilled in the art will appreciate that the machine executable instructions need not be located within the an executing machine itself, but may be accessed from coupled network devices.

In addition to the embodiments described above, those skilled in the art will appreciate that the teachings of the present invention may well be integrated with a single integrated circuit (not shown). That is, those skilled in the art will appreciate that advances in IC fabrication technology now enable complex systems to be integrated onto a single IC. Thus, in accordance with one embodiment of the present invention, the teachings of the present invention may be practiced within an application specific integrated circuits (ASIC), programmable logic devices (PLD), microcontroller, processor and the like.

While the innovative features for controlling access to network information sources of the present invention have been described in terms of the above illustrated embodiments, those skilled in the art will recognize that the invention is not limited to the embodiments described. The present invention can be practiced with modification and alteration within the spirit and scope of the appended claims. In particular, the present invention may be practiced with other features and/or feature settings. Particular examples of other features include but are not limited to transaction communication protocols and architectural attributes. Accordingly, the description is to be regarded as illustrative instead of restrictive on the present invention.

Thus, a method and apparatus for network caching and load balancing employing the integrated network address translation of the present invention has been described.

What is claimed is:

1. An apparatus comprising:
   a network interface to receive network traffic adhering to a network protocol from a data network based on a first request;
   a network address translator, coupled to the network interface, to identify network session information within the received network traffic adhering to said network protocol; and
   a controller, coupled to the network address translator, to select network traffic to be cached and to be routed for load balancing based, at least in part, on the network session information identified by the network address translator, wherein said controller forwards the same cached network traffic to a plurality of different clients in response to a plurality of requests.

2. The apparatus of claim 1, wherein the controller selects network traffic to be cached in accordance with a network management strategy programmably embedded within the controller.

3. The apparatus of claim 1, wherein the network session information includes one or more of HyperText Transfer Protocol (HTTP) resource identifier information, file transfer protocol, Gopher service name information, or Archie server name information.

4. The apparatus of claim 1, wherein selecting the appropriate network routing, the controller balances network traffic among a plurality of network routing resources, in accordance with the network management strategy.

5. An apparatus comprising:
- a network interface, communicatively coupled to a data network, to receive network traffic based on a first request;
- a storage device having stored therein a plurality of programming instructions; and
- an execution unit, coupled to the network interface and the storage device, to execute the plurality of programming instructions to provide network management services, including a network cache service employing network address translation to analyze received network traffic adhering to a network protocol to select network traffic to be cached and to forward the same cached network traffic to a plurality of different clients in response to a plurality or requests, and to select network traffic to be routed for load balancing.

6. The apparatus of claim 5, wherein the network traffic to be cached is selected in accordance with a network management strategy.

7. The apparatus of claim 5, wherein the selected network traffic is cached locally.

8. The apparatus of claim 5, wherein the selected network traffic is cached at a remote storage device communicatively coupled to the apparatus.

9. The apparatus of claim 5, wherein the network address translation service analyzes network session information of the network traffic to select network traffic to be cached.

10. The apparatus of claim 9, wherein the network session information includes one or more of HyperText Transfer Protocol (HTTP) resource identifier information, file transfer protocol, Gopher service name information, or Archie server name information.

11. The apparatus of claim 9, wherein the network session information is comprised of Open System Interconnection (OSI) layer 5 information.

12. The apparatus of claim 5, wherein the network management services further comprises a load balancing service employing network address translation to select network identify network routing information for network traffic based, at least in part, on network session information.

13. The apparatus of claim 12, wherein the load balancing service identifies network routing information for network traffic in accordance with the network management strategy.

14. An apparatus comprising:
- a network interface to receive network traffic adhering to a network protocol from a data network, the network traffic having network session information identified by a network address translator; and
- a controller, coupled to the network address translator, to route the received network traffic for load balancing and caching of the received network traffic in accordance with a network management strategy based, at least in part, on the network session information identified by the network address translator, wherein said controller forwards the same cached network traffic to a plurality of different clients in response to a plurality of requests.

15. The apparatus of claim 14, wherein the network session information is comprised of HyperText Transfer Protocol (HTTP) resource identifier information, file transfer protocol, Gopher service name information, or Archie server name information.

16. The apparatus of claim 14, wherein the network session information is Open System Interconnection (OSI) layer 5 information.

17. The apparatus of claim 14, wherein the controller further selects network traffic to be cached based, at least in part, on the network session information identified by the network address translator.

18. The apparatus of claim 17, wherein the controller selects network traffic to cache in accordance with the network management strategy.

19. A method for network caching, the method comprising:
- (a) receiving network traffic corresponding to a network protocol from a data network;
- (b) analyzing the network traffic to identify network session information; and
- (c) determining whether the network traffic is to be cached and whether to route the traffic for load balancing in accordance with a network management protocol based, at least in part, on the identified network session information of the network traffic; and
- (d) transmitting the same cached network traffic to a plurality of different clients requesting said cached network traffic.

20. The method of claim 19, further comprising:
- (d) identifying an appropriate networking data path for network traffic not selected to be cached based, at least in pan, on the identified network session information of the network traffic.

21. The method of claim 19, wherein the network session information is Open System Interconnection (OSI) layer 5 information.

22. A storage medium having stored therein a plurality of instructions which, when executed by an execution unit, causes the execution unit to implement network management services including a network caching service employing network address translation to analyze received network traffic adhering to any of a plurality of alternative data network protocols to identify network session information, wherein the network caching service selects network traffic to cache based, at least in part, on the identified network session information in accordance with a network management strategy and forwards the same cached network traffic to a plurality of different clients, said instructions further provide a load balancing service employing network address translation to identify network session information in network traffic received from a communicatively coupled data network, wherein the load balancing service beneficially routes the network traffic to its destination based, at least in part, on the identified network session information.

23. The storage medium of claim 22, wherein the plurality of programming instructions include instructions which, when executed, implement a load balancing service employing network address translation to analyze received network traffic adhering to any of a plurality of alternative data network protocols to identify network session information, wherein the load balancing service beneficially routes the network traffic to its destination based, at least in part, on the identified network session information.

* * * * *